(12) United States Patent
Park et al.

(10) Patent No.: US 9,774,939 B2
(45) Date of Patent: Sep. 26, 2017

(54) SLIM ELECTRONIC DEVICE

(71) Applicant: Samsung Electronics Co., Ltd., Gyeonggi-do (KR)

(72) Inventors: Min-Young Park, Gyeonggi-do (KR); Kwangmin Kil, Gyeonggi-do (KR); Jae-Joon Yoo, Gyeonggi-do (KR); Chang-Youl Lee, Seoul (KR); Janghoon Kang, Seoul (KR); Taeeon Kim, Seoul (KR); Youngbae Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/161,754

(22) Filed: May 23, 2016

(65) Prior Publication Data

US 2017/0048364 A1 Feb. 16, 2017

(30) Foreign Application Priority Data

Aug. 11, 2015 (KR) .................... 10-2015-0113083

(51) Int. Cl.
*H04R 1/02* (2006.01)
*H04M 1/03* (2006.01)

(52) U.S. Cl.
CPC .............. *H04R 1/028* (2013.01); *H04M 1/03* (2013.01); *H04R 2499/11* (2013.01)

(58) Field of Classification Search
CPC ........ H04M 1/026; H04M 1/03; H04R 1/028; H04R 2499/11
See application file for complete search history.

(56) References Cited

U.S. PATENT DOCUMENTS

| | | | |
|---|---|---|---|
| 8,577,072 B2* | 11/2013 | Watanabe | ............ H04R 1/2896 200/512 |
| 8,891,806 B2* | 11/2014 | Jun | ...................... H01R 12/721 379/433.02 |
| 2011/0123051 A1* | 5/2011 | Eaton | ...................... H04M 1/03 381/162 |
| 2013/0170685 A1 | 7/2013 | Oh et al. | |
| 2015/0110327 A1* | 4/2015 | Slotte | .................... H04M 1/035 381/352 |

FOREIGN PATENT DOCUMENTS

| | | |
|---|---|---|
| KR | 1020060031042 | 4/2006 |
| KR | 1020080060960 | 7/2008 |
| KR | 1020130076250 | 7/2013 |

* cited by examiner

*Primary Examiner* — Hemant Patel
(74) *Attorney, Agent, or Firm* — The Farrell Law Firm, P.C.

(57) ABSTRACT

A slim electronic device is provided. The slim electronic device includes a substrate having an opening formed therein, and an audio component accommodated in the opening of the substrate without overlapping the substrate and disposed such that the top and bottom thereof are substantially parallel to the top and bottom of the substrate.

17 Claims, 14 Drawing Sheets

SLIM ELECTRONIC DEVICE

PRIORITY

This application claims priority under 35 U.S.C. §119(a) to Korean Patent Application Serial No. 10-2015-0113083, which was filed in the Korean Intellectual Property Office on Aug. 11, 2015, the entire content of which is incorporated herein by reference.

BACKGROUND

1. Field of the Disclosure

The present disclosure generally relates to a slim electronic device, and more particularly, to a structure for mounting an audio component of the slim electronic device and a sealing device thereof.

2. Background of the Related Art

Audio components (e.g., a speaker, a microphone, etc.) may be mounted in an electronic device such as a smart phone. Among the audio components, one or more speakers may be mounted on the front or rear of the electronic device in consideration of a passage through which an acoustic sound emitted from the speaker is transmitted. The path of the sound has to be considered when a speaker is mounted in an electronic device, and the sounds that are emitted from the speaker have to be transmitted outside the electronic device without sound wave dispersion separating the sound into component frequencies.

Speaker mounting structures used in an electronic device may be classified into two structures. In the first mounting structure, a speaker is mounted in a printed circuit board (PCB) surface mount structure due to contact pins on the bottom of the speaker. The surface mounting structure causes difficulty in creating a slim electronic device because the speaker is mounted on top of the PCB so that the thickness of the electronic device increases due to the mounting structure. The first speaker mounting structure may not be applied to a case in which the total thickness of an electronic device, including the thickness of a PCB, is small because the speaker is mounted in a PCB surface mount structure.

In the second mounting structure, a flexible printed circuit board (FPCB) is used, and a terminal on the end of the FPCB is coupled to a connection pin of a PCB. Although this structure has been widely used, it is inefficient in terms of production management because a separate FPCB is manufactured for each electronic device in order to mount a speaker. Further, due to the application of a new speaker FPCB to each electronic device, the material cost of the electronic device is increased.

SUMMARY

According to an aspect of the present disclosure, an electronic device is provided that has a reduced height and an advantage in terms of mounting space by cutting a portion of the PCB in which a speaker is mounted, and has an advantage in terms of reducing material cost by excluding the FPCB through the application of contact pads to connect the speaker to the PCB.

According to an aspect of the present disclosure an electronic device is provided that can ensure a sealing space by forming ribs on upper and lower mechanical parts (a support structure and a rear case), attaching a microcellular urethane such as Poron™ material to the ribs, and attaching the ribs to the PCB.

According to an aspect of the present disclosure an electronic device is provided in which the mounted thickness of the substrate and a speaker, while a speaker is mounted in the substrate, is equal to the thickness of the speaker.

According to an aspect of the present disclosure, an electronic device includes a substrate having an opening formed therein, and an audio component accommodated in the opening of the substrate without overlapping the substrate and disposed such that the top and bottom thereof are substantially parallel to the top and bottom of the substrate.

According to an aspect of the present disclosure, an electronic device includes a support structure, a display disposed on a first surface of the support structure, a substrate disposed on a second surface opposite to the first surface of the support structure, an opening formed in the substrate, an audio component accommodated in the opening of the substrate without overlapping the substrate and disposed such that the top and bottom thereof are parallel to the top and bottom of the substrate, and a rear case that is disposed to face the support structure.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
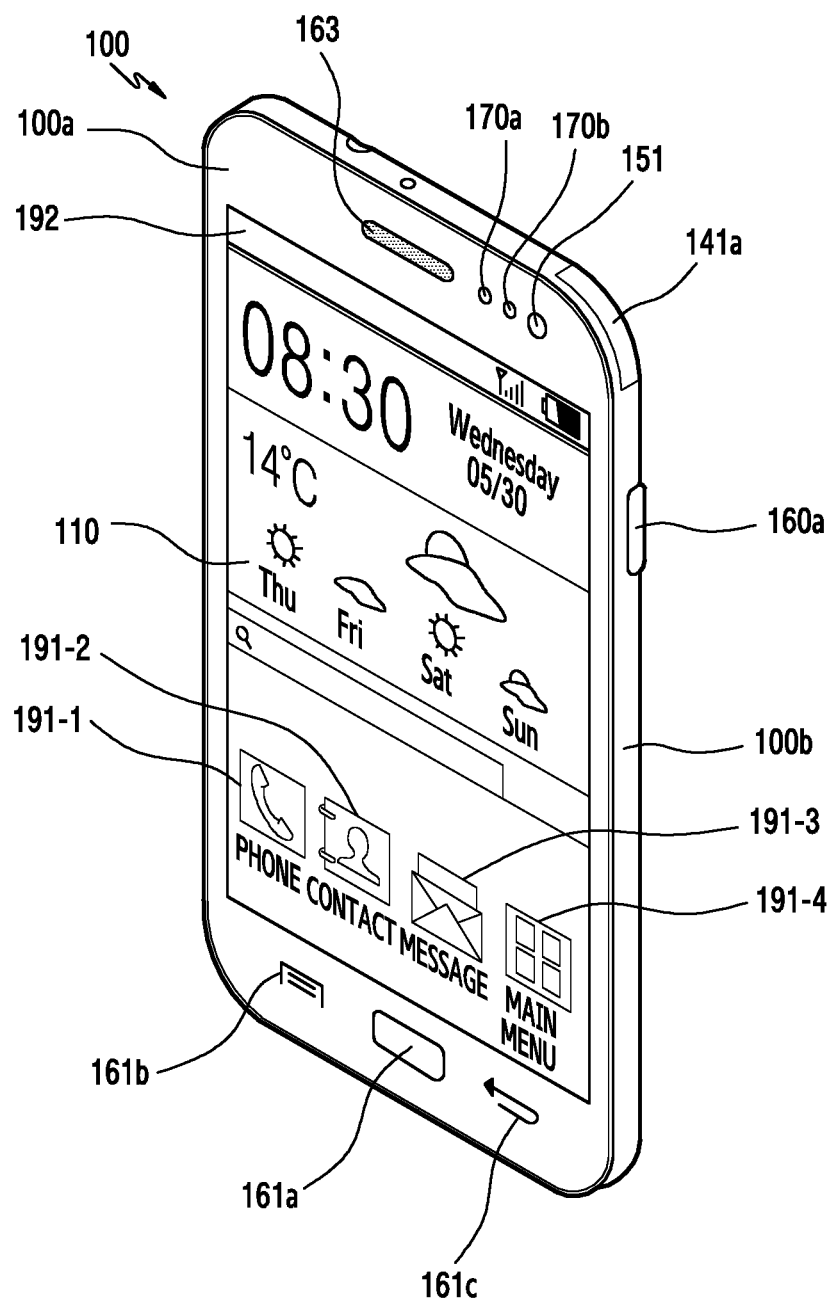
FIG. 1 is a front perspective view of an electronic device according to various embodiments of the present disclosure.

Hereinafter, various embodiments of the present disclosure will be described with reference to the accompanying drawings. The disclosure may be changed and may include various examples. Specific examples are described and related detailed descriptions are made in the present disclosure. However, it should be understood that the various examples of the disclosure are not limited to a specific embodied form and include all modifications and/or equivalents or substitutions that fall within the spirit and technical scope of the disclosure. In the drawings, similar reference numerals are used to designate similar elements.

Expressions such as "include" or "may include", etc. that may be used in the disclosure indicate the existence of a disclosed relevant function, operation, or element, etc., and do not limit additional one or more functions, operations, or elements, etc. Also, it should be understood that expressions such as "include" or "have", etc. in the disclosure are intended for designating the existence of a characteristic, a number, a step, an operation, an element, a part, or a combination of these described in the specification and do not exclude the existence or additional possibility of one or more other characteristics, numbers, steps, operations, elements, parts, or a combination of these.

Expressions such as "or", etc. in the disclosure include a certain and all combinations of words listed together. For example, "A or B" may include A and may include B, or may include both A and B.

In the disclosure, expressions such as "1st", "2nd", "first" or "second", etc. may modify various elements of the disclosure but do not limit the relevant elements. For example, the expressions do not limit the sequence and/or importance, etc. of the relevant elements. The expressions may be used for discriminating one element from another element. For example, both a first user apparatus and a second user apparatus are both user apparatuses, and represent different user apparatuses. For example, a first element may be referred to as a second element without departing from the scope of the disclosure, and similarly, a second element may be referred to as a first element.

When it is mentioned that a certain element is "connected to" or "accesses" another element, it should be understood that the element may be directly connected to another element or may directly access another element, but another element may be interposed between them. In contrast, when it is mentioned that a certain element is "directly connected to" or "directly accesses" another element, it should be understood that another element is not interposed between them.

Terminology used in the present disclosure is used for explaining specific examples and does not limit the disclosure. Unless clearly expressed otherwise, expression of the singular includes expression of the plural.

Unless defined differently, all terminologies used herein including technical or scientific terminologies have the same meaning as that generally understood by a person of ordinary skill in the art to which the disclosure belongs. It should be understood that generally used terminologies defined by a dictionary have the same meanings as in context of a related technology, and unless clearly defined in the disclosure, they are not to be understood as an ideal or excessively formal meaning.

An electronic device according to an embodiment of the present disclosure may be a device including a communication function. For example, an electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device (e.g., a head-mounted-device (HMD) such as electronic eye-glasses, electronic clothing, an electronic bracelet, an electronic necklace, an electronic appcessory, an electronic tattoo, or a smartwatch).

An electronic device may be a smart home appliance having a communication function. A smart home appliance may include a television, a digital video disk (DVD) player, an audio player, a refrigerator, an air conditioner, a cleaner, an oven, an electronic range, a washing machine, an air purifier, a set-top box, a TV box (e.g., Samsung HomeSync™, Apple TV™, or Google TV™), a game console, an electronic dictionary, an electronic key, a camcorder, or an electronic frame.

An electronic device may include various medical devices (e.g., magnetic resonance angiography (MRA), magnetic resonance imaging (MRI), computed tomography (CT), an ultrasonic device, etc.), a navigation device, a global positioning system (GPS) receiver, an event data recorder (EDR), a flight data recorder (FDR), an automobile infotainment device, electronic equipment for a ship (e.g., a navigation device for a ship, a gyro compass, etc.), an avionic device, a security device, or a robot for industrial use or home use.

An electronic device may include at least one of furniture or a portion of a building/structure including a communication function, an electronic board, an electronic signature receiving device, a projector, or various measurement devices (e.g., water meter, electric meter, gas meter, or radio wave measuring device, etc.). An electronic device may be a combination of one or more of the above-described devices. The electronic device examples of the present disclosure are not limited to the above-described devices.

An electronic device according to an embodiment of the present disclosure is described with reference to the accompanying drawings. As used herein, the term "user" may indicate a person who uses an electronic device or a device (e.g., an artificial intelligence electronic device) that uses an electronic device.

Figure 2:
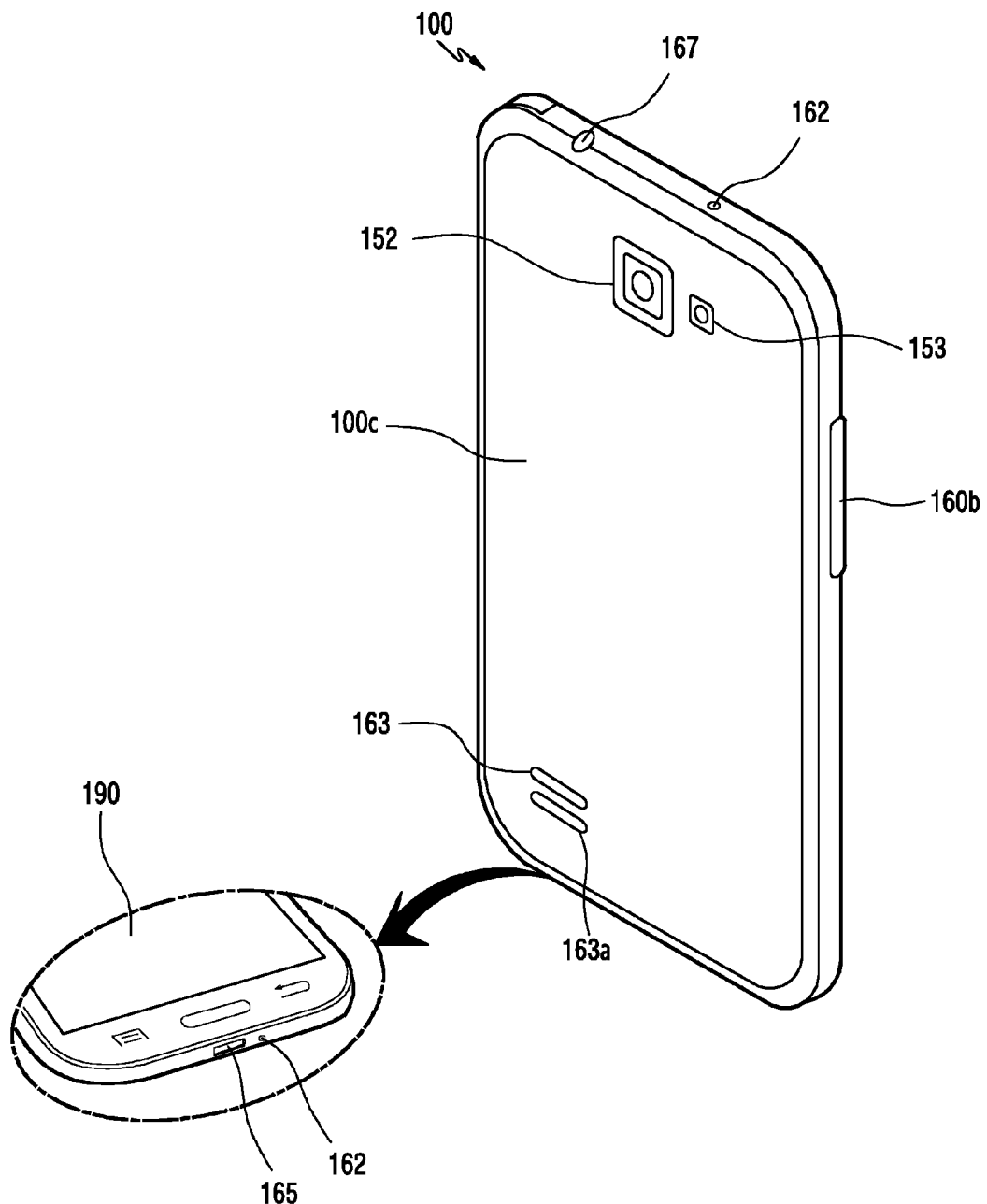
FIG. 2 is a rear perspective view of an electronic device according to various embodiments of the present disclosure.

FIG. 1 is a front perspective view of an electronic device according to an embodiment of the present disclosure. FIG. 2 is a rear perspective view of an electronic device according to an embodiment of the present disclosure.

Referring to FIGS. 1 and 2, the electronic device 100 includes a touch screen 190 disposed in the center of the front 100a thereof. The touch screen 190 is large in size to occupy almost the entire front 100a of the electronic device 100. The touch screen 190 may display various content. In FIG. 1, the main home screen is displayed on the touch screen 190. The main home screen is the first screen that is displayed on the touch screen 190 when the electronic device 100 is turned on. Further, in a case where the electronic device 100 has several pages of different home screens, the main home screen may be the first of the several pages of home screens. Shortcut icons 191-1, 191-2, and 191-3 are used for executing frequently used applications, a main menu switching key 191-4, time, weather, etc. may be displayed on the home screen. The main menu switching key 191-4 is used to display a menu screen on the touch screen 190. Further, a status bar 192 that indicates the state of the electronic device 100, such as a battery charging state, the strength of a received signal, and the current time, may be displayed on the upper end of the touch screen 190. A home button 161a, a menu button 161b, and a back button 161c may be formed on the lower side of the touch screen 190.

The home button 161a may be used to display the main home screen on the touch screen 190. For example, while a home screen that is different from the main home screen, or the menu screen, is displayed on the touch screen 190 when the home key 161a is touched, the main home screen may be displayed on the touch screen 190. Furthermore, while applications are being executed and content displayed on the touch screen 190, when the home button 191a is touched, the main home screen illustrated in FIG. 1 may be displayed on the touch screen 190. In addition, the home button 161a may be used to display recently used applications or a task manager on the touch screen 190.

The menu button 161b provides a connectivity menu that may be used on the touch screen 190. The connectivity menu may include a widget addition menu, a background switching menu, a search menu, an editing menu, an environment setting menu, etc. The back button 161c may be used to display the screen that was executed just before the currently executed screen, or to complete the most recently used application.

A first camera 151, an illumination sensor 170a, and a proximity sensor 170b are disposed on the edge portion of the front 100a of the electronic device 100, according to various embodiments of the present disclosure.

A second camera 152, a flash 153, and a speaker 163 are disposed on the rear 100c of the electronic device 100, according to various embodiments of the present disclosure. Two sound holes 163a may be formed in the rear 100c of the electronic device to transmit sound emitted from a speaker to the outside. The rear 100c of the electronic device may be integrally, or detachably, formed with the electronic device. The rear 100c of the electronic device 100 may also be referred to as a back cover, an accessory cover, or a battery cover. The rear 100c of the electronic device 100 may be formed of an injection material, a metal material, or a combination thereof.

A power/reset button 160a, a volume button 160b, a terrestrial digital multimedia broadcasting (DMB) antenna 141a for receiving broadcast multimedia, one or more microphones 162, etc. are disposed on the lateral side 100b of the electronic device 100, according to various embodiments of the present disclosure. The DMB antenna 141a may be secured to, or detachably coupled to, the electronic device 100.

A connector 165 is formed on the bottom of the electronic device 100. The connector 165 may have a plurality of electrodes formed therein, and may be connected to an external device in a wired manner. An earphone connecting jack 167 is disposed on the top of the electronic device 100. The plug of the earphones may be inserted into the earphone connecting jack 167. The earphone connecting jack 167 may be disposed on the bottom of the electronic device 100.

Figure 3:
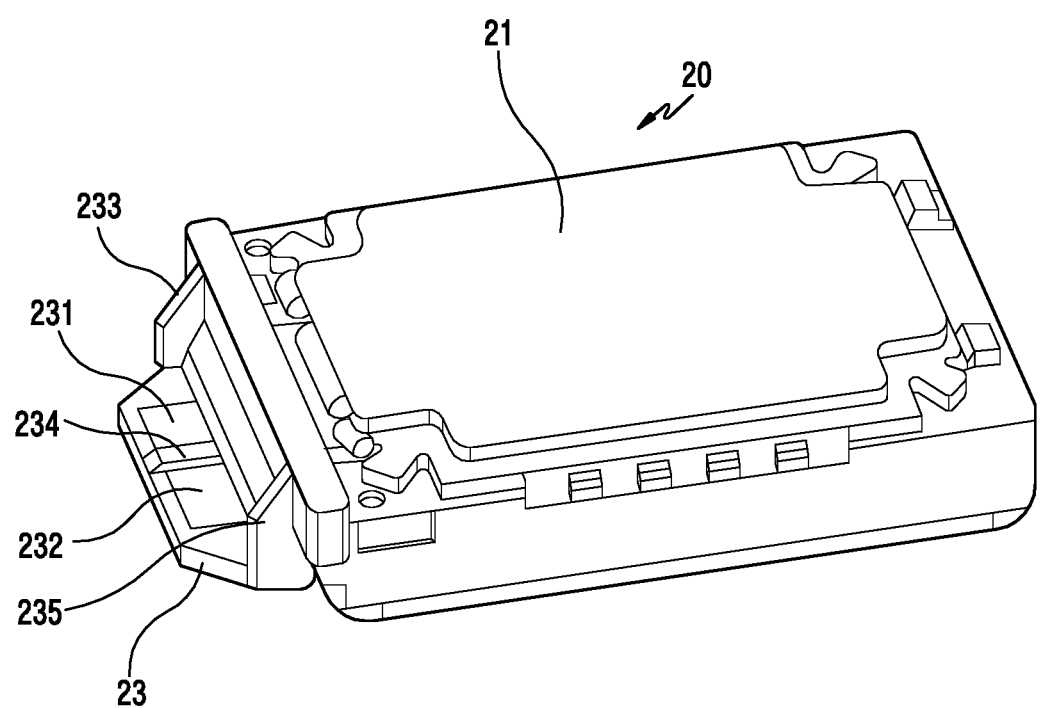
FIG. 3 is a perspective view of an audio component according to an embodiment of the present disclosure.
Figure 4A:
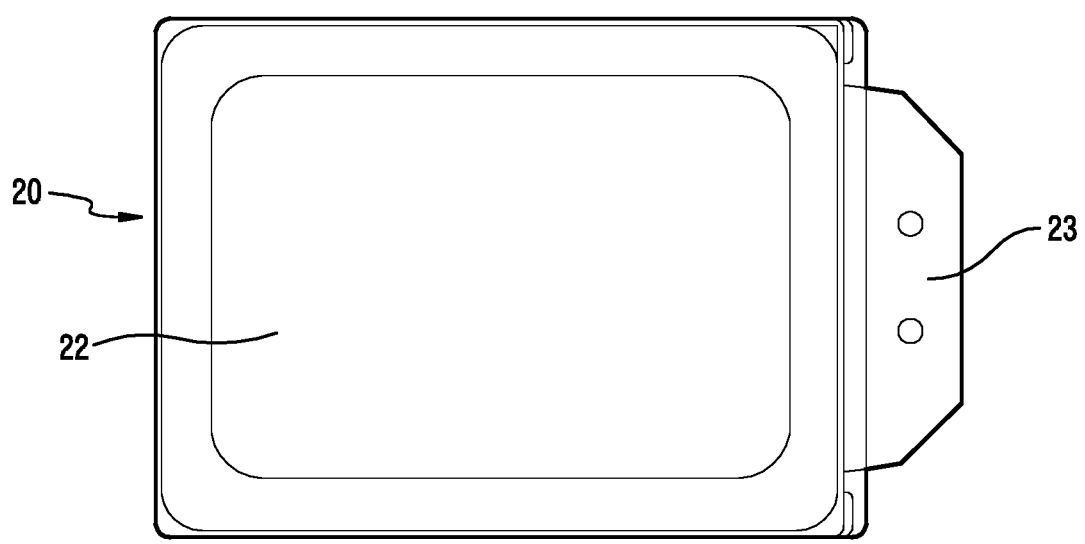
FIG. 4A is a top plan view of an audio component according to an embodiment of the present disclosure.
Figure 4B:
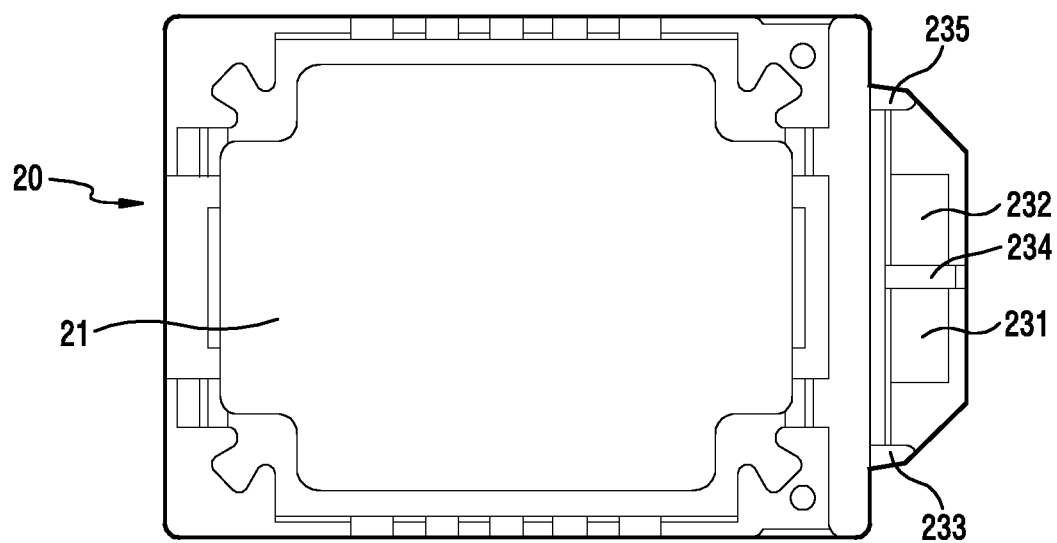
FIG. 4B is a rear view of an audio component according to an embodiment of the present disclosure.
Figure 4C:
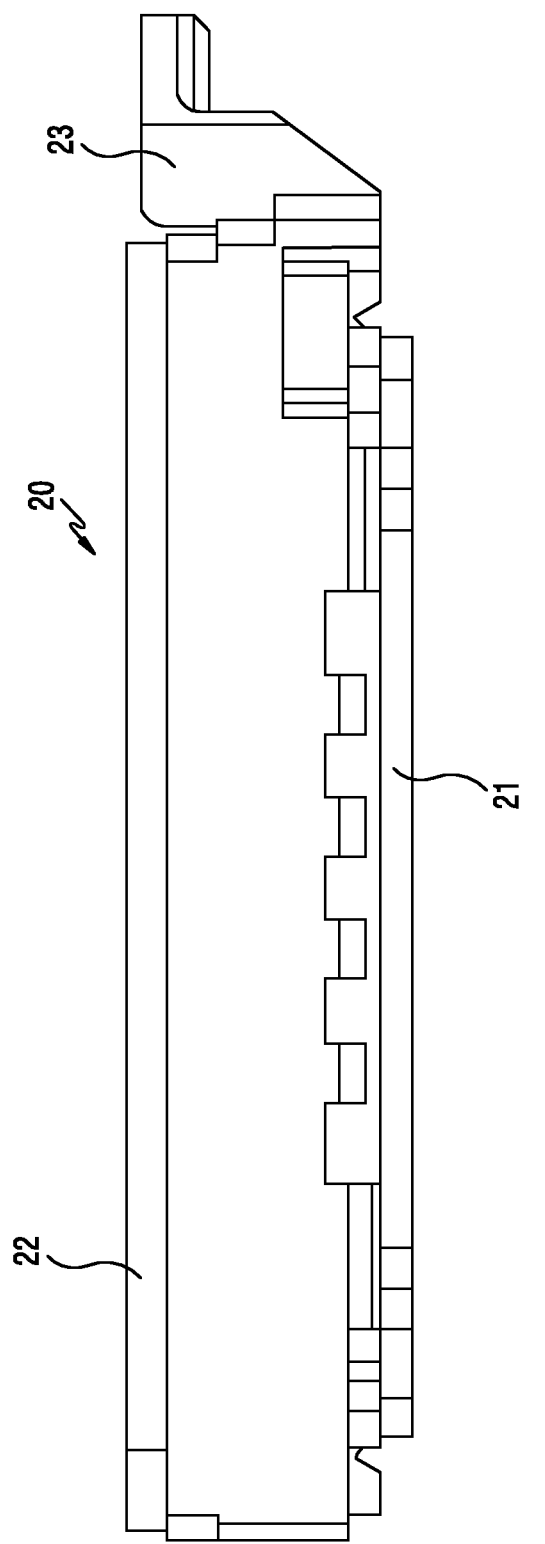
FIG. 4C is a side view of an audio component according to an embodiment of the present disclosure.

FIG. 3 is a perspective view of an audio component according to an embodiment of the present disclosure. FIG. 4A is a top plan view of an audio component according to an embodiment of the present disclosure. FIG. 4B is a rear view of an audio component according to an embodiment of the present disclosure. FIG. 4C is a side view of an audio component according to an embodiment of the present disclosure.

Referring to FIGS. 3 and 4A to 4C, the audio component 20, according to an embodiment of the present disclosure, may be, for example, a speaker, and at least one audio component may be mounted in the electronic device. The audio component may be mounted in a substrate to reduce the mounting thickness.

The audio component 20, according to an embodiment of the present disclosure, has first and second resilient bodies 21 and 22 that are attached to a first surface and a second surface opposite to the first surface, respectively. The audio component 20 may be mounted in a substrate according to a process in which a support structure and a rear case are assembled, and the first and second resilient bodies 21 and 22 may be attached to support the audio component 20 according to the mounting structure. For example, the first and second resilient bodies 21 and 22 may be formed of a microcellular urethane material such as Poron™ that is similar to a sponge. The first resilient body 21 may be attached to the first surface of the audio component 20, and the second resilient body 22 may be attached to the second surface of the audio component 20. The first surface may refer to the top of the audio component 20, and the second surface may refer to the bottom of the audio component 20.

The audio component 20, according to an embodiment of the present disclosure, includes a flange 23 on a lateral side thereof, which has the shape of a protrusion. The flange may have a reverse-insertion preventing structure and may be formed in a shape having an orientation to prevent incorrect insertion of the audio component 20. The flange 23 may have a first surface and a second surface opposite to the first surface. The first surface of the flange 23, may be parallel to the first surface of the audio component 20 to which the first resilient body 21 is attached. One or more contact pads 231 and 232 are mounted on the second surface of the flange 23. One pair of contact pads 231 and 232 are formed as a connector to be connected to a substrate, which will be described below. The flange 23, includes one or more reinforcing ribs (protrusions) 233, 234, and 235 for supporting the connection of the audio component 20. The flange 23 has three reinforcing ribs formed thereon, one of which may be formed between the contact pads 231 and 232 and the others may be formed on the opposite sides of the contact pads 231 and 232. The audio component 20 is not directly mounted in the substrate, but is mounted in the substrate by coupling the audio component 20 to the rear case, coupling the substrate to the support structure, and then coupling the support structure to the rear case. As a result, the first and second resilient bodies 21 and 22 and the flange 23 can contribute to supporting the mounting or connection state of the audio component 20.

Hereinafter, the mounting structure and the sealing structure of the audio component 20, according to an embodiment of the present disclosure, will be described with reference to the accompanying drawings.

Figure 5:
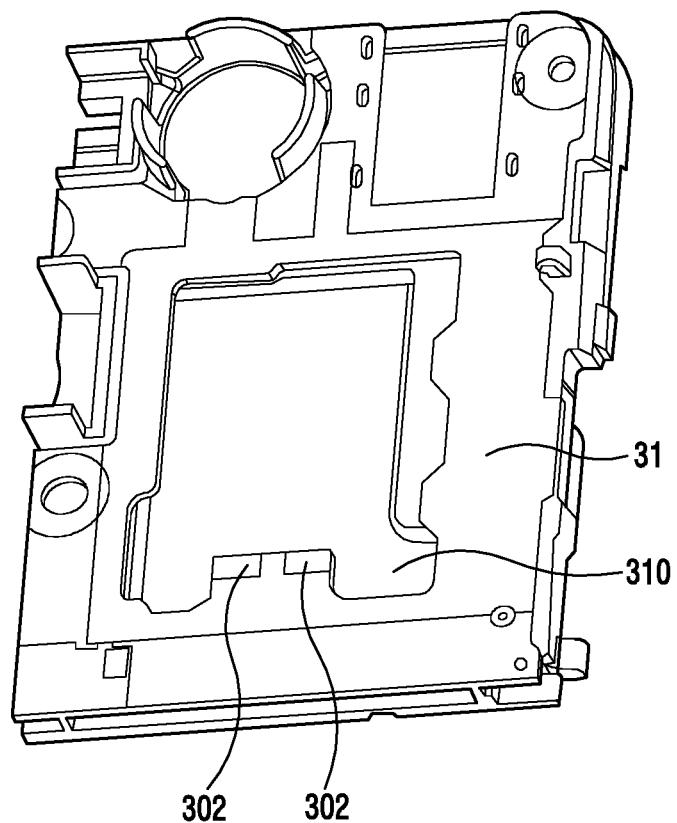
FIG. 5 is a perspective view illustrating a substrate having an opening formed therein, according to an embodiment of the present disclosure.
Figure 6:
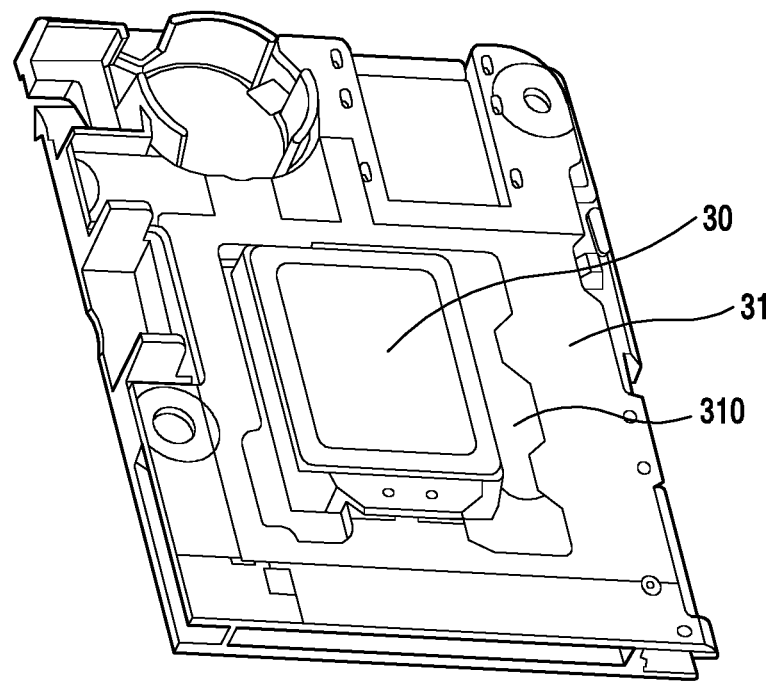
FIG. 6 is a perspective view illustrating an audio component mounted in the opening of a substrate, according to an embodiment of the present disclosure.

FIG. 5 is a perspective view illustrating a substrate having an opening formed therein, according to an embodiment of the present disclosure. FIG. 6 is a perspective view illustrating an audio component mounted in the opening of a substrate, according to an embodiment of the present disclosure.

Referring to FIGS. 5 and 6, the mounting structure of the audio component 30, according to an embodiment of the present disclosure include the substrate 31, the opening 310 formed in the substrate 31, and the audio component 30 disposed within the opening 310. In particular, the audio component 30 may be accommodated in the opening 310 to not overlap the substrate 31, and may be disposed such that the top and bottom thereof are parallel to the top and bottom of the substrate 31 respectively. The mounting thickness in which the audio component 30 is mounted in the substrate, may be equal to the thickness of the audio component 30. In addition, the audio component 30 may also be mounted in the substrate 31 in a surface mount PCB structure. A method of mounting the audio component 30 will be described below. The opening 310 formed in the substrate 31, may have a size that is sufficient to accommodate the audio component 30. The substrate 31 may include contact terminals 302 that are connected to the audio component 30. The contact terminals 302 may be located on the perimeter of the opening 310. The contact terminals 302 may be provided as a pair and may be connected by a C-clip, such as a snap ring. One pair of contact pads 231 and 232 of the audio component 30 may be connected to one pair of contact terminals 302. When the audio component 30 is mounted in the substrate 31, the audio component 30 may be maintained in a stable fashion parallel to the substrate 31 without overlapping the substrate 31, while being accommodated in the opening 310 of the substrate, and may be maintained in the connection state.

Figure 7:
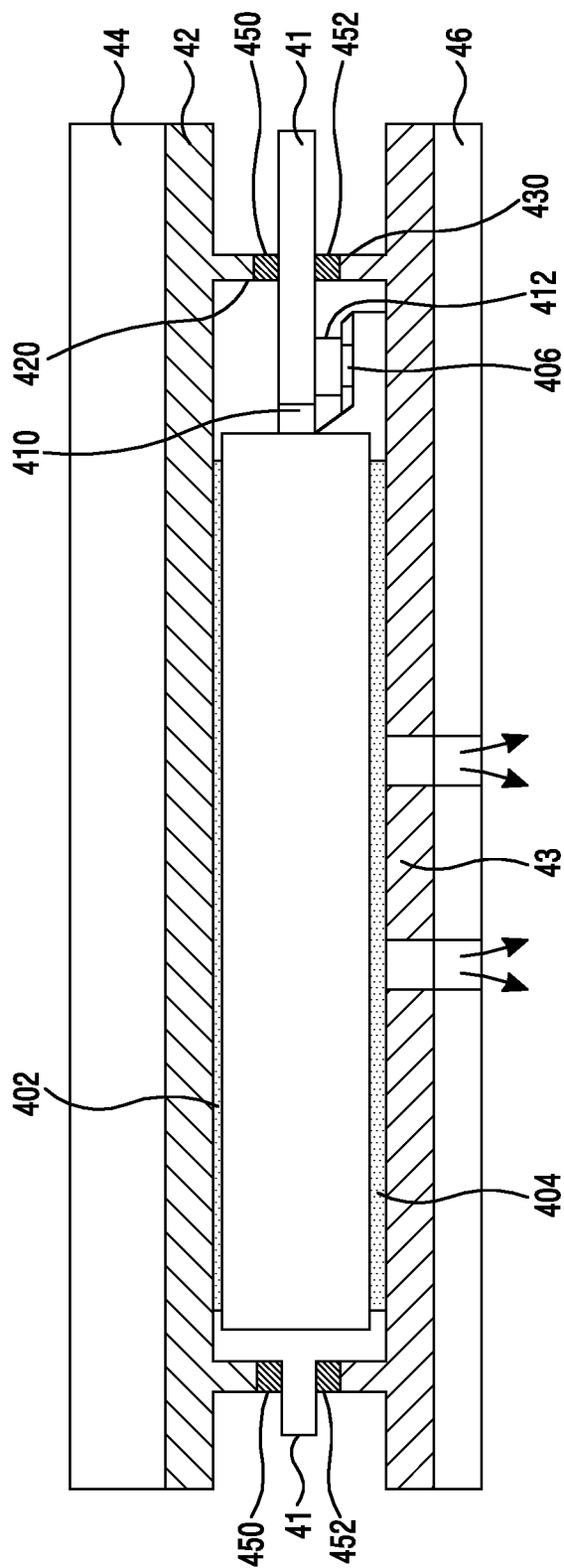
FIG. 7 is a cross sectional view illustrating a state in which an audio component is mounted in an electronic device, according to an embodiment of the present disclosure.
Figure 8:
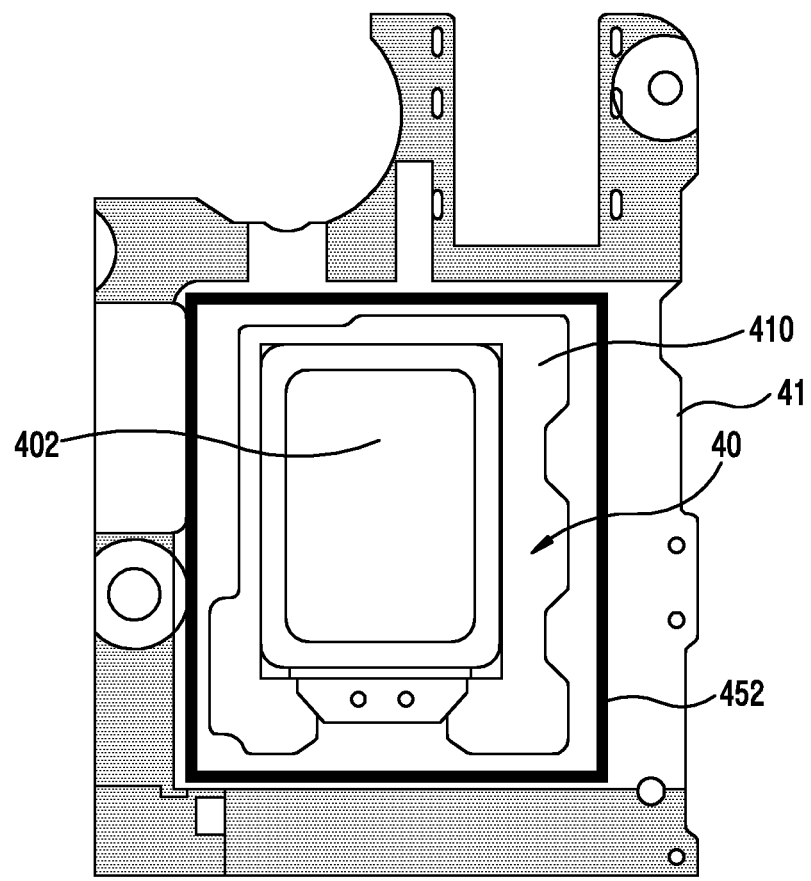
FIG. 8 is a top plan view illustrating a sealing member provided around an audio component that is mounted in a substrate, according to an embodiment of the present disclosure.

FIG. 7 is a cross sectional view illustrating a state in which an audio component is mounted in an electronic device, according to an embodiment of the present disclosure. FIG. 8 is a top plan view illustrating a sealing member provided around the audio component that is mounted in a substrate, according to an embodiment of the present disclosure.

The sealing structure of the audio component 40, according to an embodiment of the present disclosure, will be described with reference to FIGS. 7 and 8.

Referring to FIGS. 7 and 8, the mounting structure of the audio component 40, according to an embodiment of the present disclosure, include a support structure 42, a display module 44 disposed on a first surface of the support structure 42, the substrate 41 disposed on a second surface opposite to the first surface of the support structure 42, an opening 410 formed by cutting the substrate 41, the audio component 40 accommodated in the opening 410 without overlapping the substrate 41, and disposed such that the top and bottom thereof are parallel to the top and bottom of the substrate respectively, and a rear case 43 disposed to face the audio component 40 to protect the audio component.

The support structure 42, which is a type of support plate, may be a bracket that supports the display module 44 and the substrate 41. The support structure 42 may be formed of an injection material, a metal material, or a combination thereof. Further, the support structure 42 may be formed of a light alloy material. The support structure 42 may include the first surface and the second surface opposite to the first surface. The first surface is the upper surface on which the display module 44 may be disposed and supported. The second surface is the lower surface on which the substrate 41 may be disposed and supported.

When the audio component 40 is mounted in the substrate 41, the first surface of the audio component 40 may face the second surface of the support structure 42, and the second surface of the audio component 40 may face the rear case 43. Further, when the audio component 40 is mounted in the substrate 41, a first resilient member 402 attached to the first surface of the audio component 40 may be disposed close to the second surface of the support structure 42, and a second resilient member 404 attached to the second surface of the audio component 40 may be disposed close to the rear case 43. The mounting or connection state of the audio component 40 may be maintained in a stable fashion due to the support provided by the first and second resilient members 402 and 404, which are attached to the first and second surfaces of the audio component 40, and are disposed close to the support structure 42 and the rear case 43, respectively.

The sealing structure of the audio component 40, according to an embodiment of the present disclosure, includes first and second sealing members 450 and 452 and first and second sealing walls 420 and 430. The first sealing member 450 may be formed of a high-resilient resin material, such as rubber or urethane, and may extend around the opening 410 on the first surface of the substrate. Further, the first sealing member 450 may be formed in the shape of a closed curve that continually extends around the opening 410 to surround the opening 410. The second sealing member 452 may be formed of a high-resilient resin material, such as rubber or urethane, and may extend around the opening 410 on the second surface of the substrate. Further, the second sealing member 452 may be formed in the shape of a closed curve that continually extends around the opening 410 to surround the opening 410. The first and second sealing members 450 and 452 may face each other with respect to the substrate.

The first sealing wall 420 extends toward the substrate 41 from the first surface of the support structure 42. The first sealing wall 420 may extend by a length that is sufficient to make close contact with the first sealing member 450. The first sealing wall 420 may vertically extend from the first surface of the support structure 42, and may be formed to surround the opening 410. Further, the second sealing wall 430 may extend toward the substrate 41 from the rear case 43. The second sealing wall 430 may extend by a length that is sufficient to make close contact with the second sealing member 452. The second sealing wall 430 may vertically extend from the rear case 43, and may be formed to surround the opening 410.

The sealing structure of the audio component 40 may collect sounds generated from the audio component 40 and may direct the collected sounds toward the outside of the electronic device 100 through sound holes formed in the rear case 43. The sealing structure of the audio component 40 may function as a sound duct to direct the sound through the sound holes. The rear case 43 may be coupled to a back cover 46 of the electronic device, or may be disposed to face the back cover 46. The back cover 46 may be referred to as a battery cover or an accessory cover. The sound holes formed in the rear case 43 and the sound holes formed in the back cover 46, which are sound passages, direct the sound emitted from the audio component 40 toward the outside of the electronic device 100.

According to the above sealing structure, the sound emitted from the audio component 40 may be collected by the sealing structure and transmitted to the outside of the electronic device 100 through the sound holes formed in the rear case 43 and the back cover 46.

Figure 9:
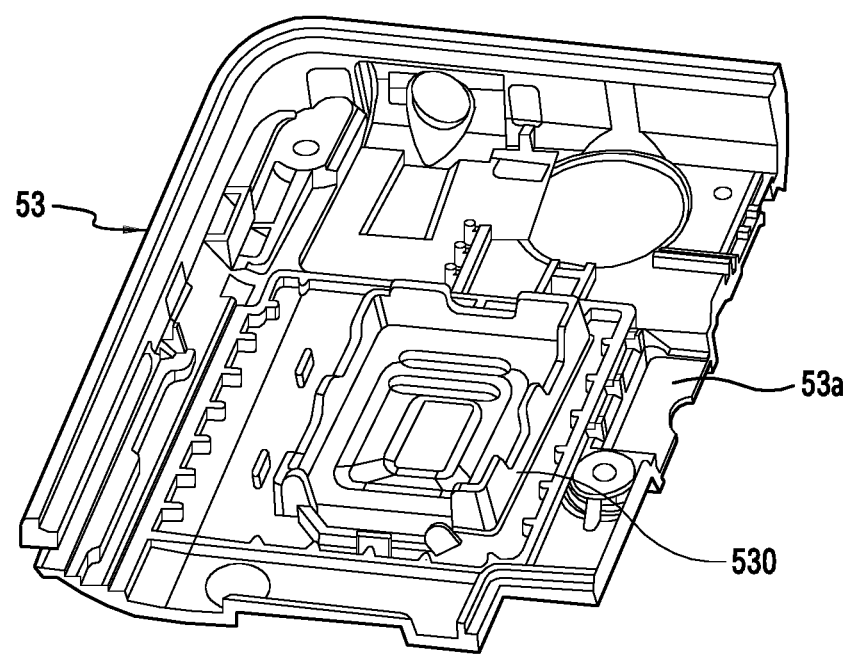
FIG. 9 is a perspective view illustrating the inside of a rear case to which an audio component is coupled, according to an embodiment of the present disclosure.
Figure 10:
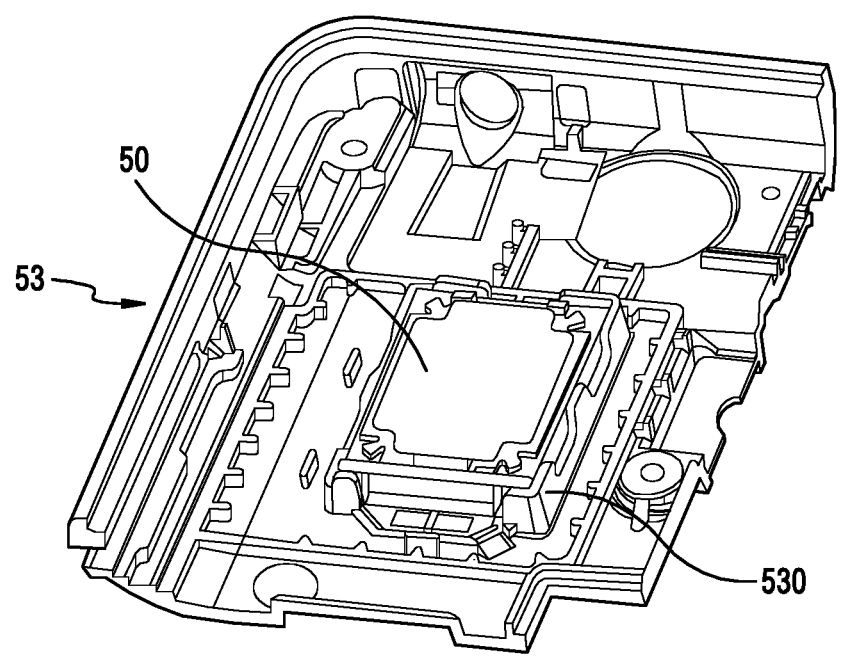
FIG. 10 is a perspective view illustrating a state in which an audio component is coupled to the inside of the rear case, according to an embodiment of the present disclosure.
Figure 11:
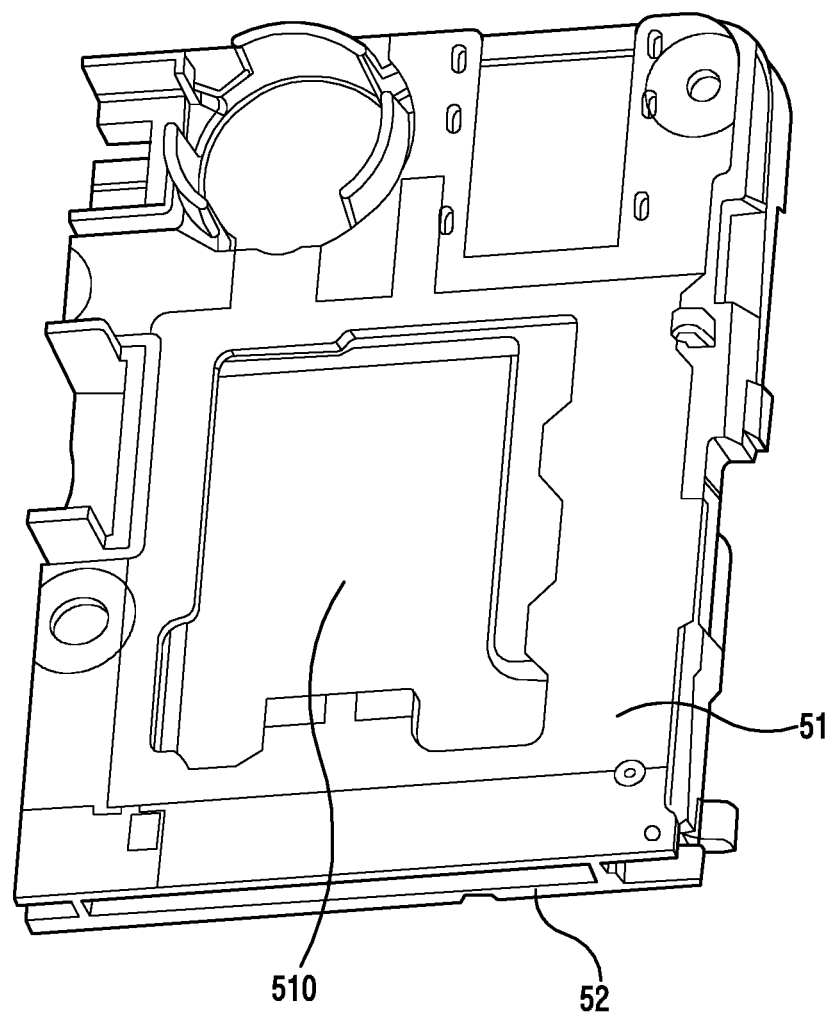
FIG. 11 is a perspective view illustrating a state in which a support structure is coupled to a substrate, according to an embodiment of the present disclosure.

FIG. 9 is a perspective view illustrating the inside of a rear case to which an audio component is coupled, according to an embodiment of the present disclosure. FIG. 10 is a perspective view illustrating a state in which the audio component is coupled to the inside of the rear case, according to an embodiment of the present disclosure. FIG. 11 is a perspective view illustrating a state in which a support structure is coupled to a substrate, according to an embodiment of the present disclosure.

A method of assembling the audio component 50, according to an embodiment of the present disclosure, will be described with reference to FIGS. 9 to 11. In the method of mounting the audio component 50 in the substrate 51, the audio component 50 is not directly mounted in the substrate 51, but may be connected to the substrate while being mounted in an opening 510 of the substrate 51 by assembling the audio component 50 to a rear case 53, coupling the substrate 51 to the support structure 52, and then assembling the support structure 52 and the rear case 53.

Referring to FIGS. 9 and 10, the audio component 50, according to an embodiment of the present disclosure, may be coupled to the rear case 53 first. A support wall 530 may be formed on the inside 53a of the rear case 53 to enable the audio component 50 to be assembled. The audio component 50 may be mounted inside the support wall 530 such that the second surface of the audio component 50 is directed toward the rear case 53. The audio component 50 coupled to the rear case 53 is illustrated in FIG. 10.

Referring to FIG. 11, the substrate 51, according to an embodiment of the present disclosure, may be coupled to, and supported by, the support structure 52. In this case, the substrate 51 may be coupled to the support structure 52 in a state in which the opening 510 is formed in the substrate 51. In this state, when the rear case 53 is coupled to the support structure 52, the audio component 50 assembled to the rear case 53, may be accommodated in the opening 510 of the substrate and may be connected to the substrate 51.

The audio component 50 may be completely assembled by the above assembly method. In other words, the audio component 50 may be connected to the substrate 51 and may be completely sealed by the above assembly method.

Figure 12:
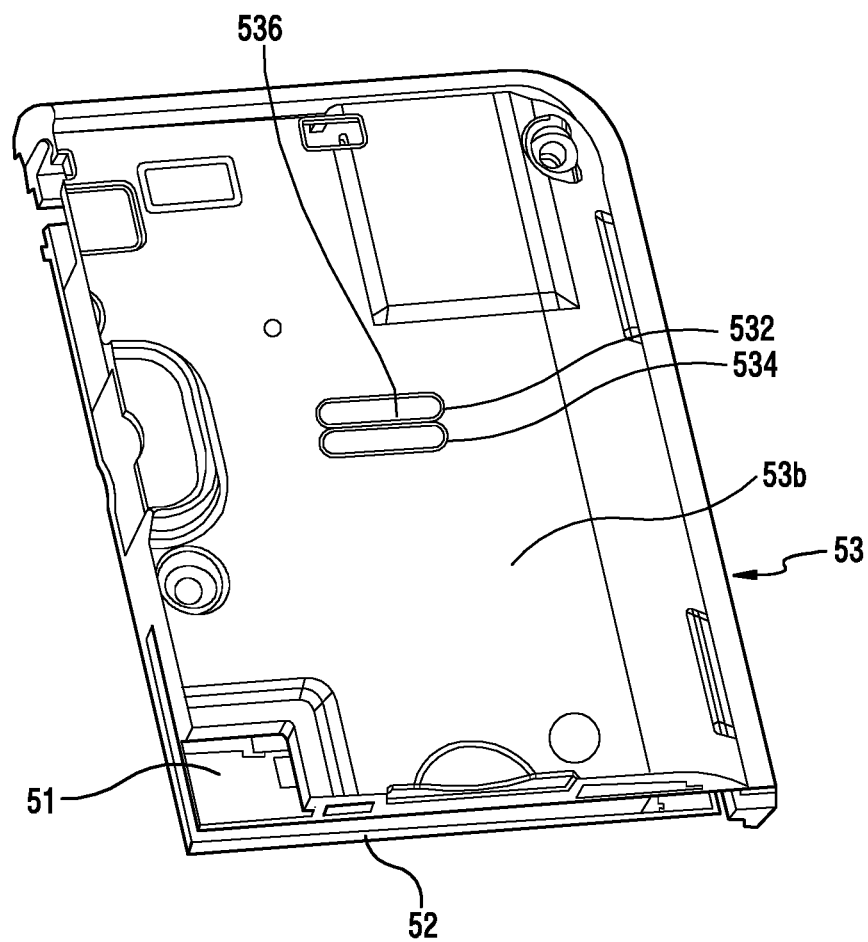
FIG. 12 is a perspective view illustrating a part of the exterior of a rear case to which a support structure is coupled, according to an embodiment of the present disclosure.

The audio component 50 assembled by the above assembly method may have an external appearance illustrated in FIG. 12. FIG. 12 is a perspective view illustrating a part of the exterior of a rear case to which a support structure is coupled, according to an embodiment of the present disclosure.

Referring to FIG. 12, the rear case 53 includes two sound holes 532 and 534 formed therein for transmitting a sound emitted from the audio component 50 to the outside of the electronic device. A protective net structure formed of stainless steel may be provided just below the two sound holes 532 and 534.

The mounting structure as described herein, according to an embodiment of the present disclosure, may be applied to various electronic components that exhibit a disadvantage due to their large size, without being limited to a speaker or other audio components.

The term "module" as used herein may, for example, refer to a unit including one of hardware, software, firmware or a combination of two or more of them. The term "module" may be interchangeably used with, for example, the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to an embodiment of the present disclosure, may include an application-specific integrated circuit (ASIC) chip, a field-programmable gate array (FPGA), and a programmable-logic device for performing operations which has been known or are to be developed hereinafter.

According to an embodiment of the present disclosure, at least some of the devices (for example, modules or functions thereof) or the method (for example, operations) may be implemented by a command stored in a computer-readable storage medium in a programming module form. When the command is executed by one or more processors, the one or more processors may execute a function corresponding to the command. The computer-readable storage medium may be, for example, memory. At least some of the programming modules may be implemented (for example, executed) by, for example, a processor. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high level language codes, which can be executed in a computer by using an interpreter, as well as machine codes made by a compiler. The aforementioned hardware device may be configured to operate as one or more software modules in order to perform the operation of the present disclosure, and vice versa.

The programming module according to an embodiment of the present disclosure may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added.

Embodiments disclosed in the present specification and drawings are presented to describe the technical contents of the present disclosure and help with the understanding of the present disclosure and do not limit the scope of the present disclosure. Therefore, all changes or modifications derived from the technical idea of the present disclosure as well as the embodiments described herein, should be interpreted to belong to the scope of the present disclosure as described in the appended claims and their equivalents.

What is claimed is:

1. An electronic device comprising:
   a substrate having an opening formed therein; and
   an audio component accommodated in the opening of the substrate without overlapping the substrate and disposed such that the top and bottom thereof are parallel to the top and bottom of the substrate,
   wherein the audio component has first and second resilient bodies attached to the top and bottom of the audio component, respectively, and the first and second resilient bodies are formed of a plate-shaped microcellular urethane material.

2. The electronic device of claim 1, wherein the audio component comprises a flange.

3. The electronic device of claim 2, wherein the flange comprises a plurality of reinforcing ribs.

4. The electronic device of claim 2, wherein the flange comprises a contact pad connected to a contact terminal of the substrate.

5. The electronic device of claim 1, wherein the audio component is a speaker.

6. The electronic device of claim 1, wherein a plurality of sound holes are formed in a rear case of the electronic device.

7. The electronic device of claim 6, wherein the rear case faces a back of the electronic device.

8. The electronic device of claim 1, further comprising:
   a sealing device that extends around the substrate opening in which the audio component is disposed.

9. The electronic device of claim 8, wherein the sealing device comprises first and second sealing members that extend around the opening on the top and bottom of the substrate, respectively.

10. An electronic device comprising:
a support structure;
a display disposed on a first surface of the support structure;
a substrate disposed on a second surface of the support structure opposite to the first surface of the support structure;
an opening formed in the substrate;
an audio component accommodated in the opening of the substrate without overlapping the substrate and disposed such that the top and bottom thereof are parallel to the top and bottom of the substrate; and
a rear case that is disposed to face the support structure,
wherein the audio component comprises a sealing device, and
wherein the sealing device comprises:
a first sealing member extending around the opening on a first surface of the substrate;
a second sealing member extending around the opening on a second surface of the substrate;
a first sealing wall that extends from the second surface of the support structure toward the substrate and is disposed close to the first sealing member; and
a second sealing wall that extends from the rear case toward the substrate and is disposed close to the second sealing member.

11. The electronic device of claim 10, wherein a first surface of the audio component faces the second surface of the support structure, and a second surface of the audio component faces the rear case.

12. The electronic device of claim 11, wherein the audio component has first and second resilient bodies attached to the top and bottom of the audio component respectively, wherein the first resilient body on the top of the audio component is disposed close to the rear case, and the second resilient body on the bottom of the audio component is disposed close to the support structure.

13. The electronic device of claim 10, wherein, when the support structure is assembled to the rear case, the audio component is electrically connected to the substrate.

14. The electronic device of claim 10, wherein the audio component is assembled by assembling the substrate to the support structure, assembling the audio component to the rear case, and assembling the rear case to the support structure.

15. The electronic device of claim 10, wherein the audio component is sealed by assembling the substrate to the support structure, assembling the audio component to the rear case, and assembling the rear case to the support structure.

16. The electronic device of claim 10, wherein a sound emitted from the audio component is directed toward the outside of the electronic device through at least one sound hole formed in the rear case.

17. The electronic device of claim 10, wherein the thickness of the substrate with the mounted audio component is equal to the thickness of the audio component.

* * * * *